Dec. 26, 1933. E. A. ARNDT Re. 19,035

COMBINATION TRUNK AND LUGGAGE CARRIER

Original Filed Feb. 6, 1929 2 Sheets-Sheet 1

Inventor

Ernest A. Arndt

By Lynn H. Latta

Attorney

Dec. 26, 1933. E. A. ARNDT Re. 19,035

COMBINATION TRUNK AND LUGGAGE CARRIER

Original Filed Feb. 6, 1929 2 Sheets-Sheet 2

Inventor

Ernest A. Arndt

By

Lynn H. Latta

Attorney

Reissued Dec. 26, 1933

Re. 19,035

UNITED STATES PATENT OFFICE 19,035

COMBINATION TRUNK AND LUGGAGE CARRIER

Ernest A. Arndt, Sioux City, Iowa

Original No. 1,792,798, dated February 17, 1931, Serial No. 337,873, February 6, 1929. Application for reissue July 25, 1932. Serial No. 624,581

21 Claims. (Cl. 224—29)

My invention relates to a combination trunk and luggage carrier either of the type first disclosed in my patent reissued as Number 16,665, or of other types, and it is my present purpose to improve upon the general construction of such types of trunks.

The primary object of this invention is to provide a trunk of this type having a cover adapted to disclose the contents of the trunk while the swinging trunk member is in closed position. The need for this feature arises from the fact that the downward swinging of the movable trunk member will ordinarily disarrange the contents of the trunk where a large number of small articles are packed within the trunk. The use of this feature makes it possible to pack the contents of the trunk in orderly arrangement and to retain this orderly arrangement during the opening of the trunk to allow access to the upper layer of articles.

A further object of my invention is to provide a trunk of this class including the cover feature, in which the subordinate functions attendant upon the main feature of the auxiliary cover are attained in the simplest, most economical and most satisfactory manner. For instance, it is essential that means be provided for latching or locking the swinging trunk member to the fixed trunk member. In my present invention, this is accomplished by providing one of the latching elements on the cover itself, the other latching element being secured to the fixed trunk member. Furthermore, where the movable trunk member is formed in two parts, as it must necessarily be formed where a portion of it is a hinged cover, a problem arises, that of bracing between the sides of the movable trunk member.

In my invention it is my object to simplify the construction as much as possible and in meeting this problem of bracing, I obtain simplicity of construction without sacrificing strength by employing the cover itself as a bracing member to connect the sides of the movable trunk member. This eliminates the necessity of a brace between the sides of the movable trunk member.

Still a further object is to provide means for latching the fixed and movable members of a trunk together which comprises the provision of coacting latch members on the fixed trunk member and on a hinged member such as the cover.

Another object is to provide a trunk which is as nearly moisture proof as could be possible in a trunk. This problem, in view of the number of movable parts involved, is a bigger problem than in the ordinary trunk and in the present invention I have solved this problem by arranging the cover to overlap the sides of the movable trunk member. It is impossible to overlap both the fixed trunk member and the movable trunk member, as such a construction would interfere with the opening of the cover.

The cover and fixed trunk member are provided, however, with coacting members, adapted to be urged into engagement with each other, as the cover is moved toward closed position, thus forming a tight connection between the cover and the fixed trunk member.

In furtherance of my object to provide a moisture tight trunk, it is my purpose to include in the trunk construction a hinge construction which is particularly adapted to exclude the weather.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
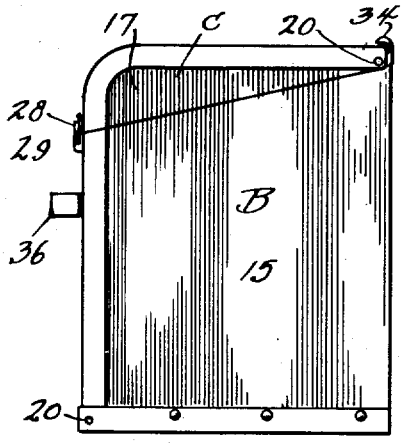
Fig. 1 is a side elevation of my combined trunk and luggage carrier in fully closed position.
Figure 2:
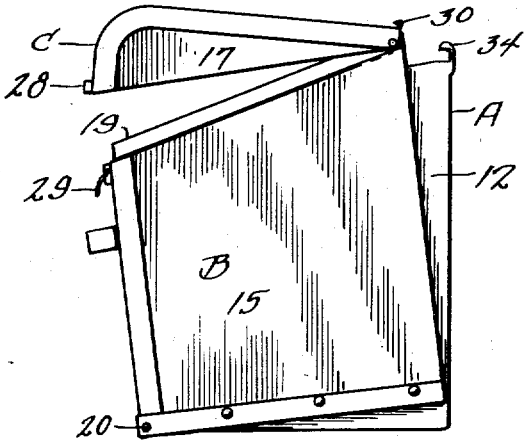
Fig. 2 shows the parts in partially opened positions.
Figure 3:
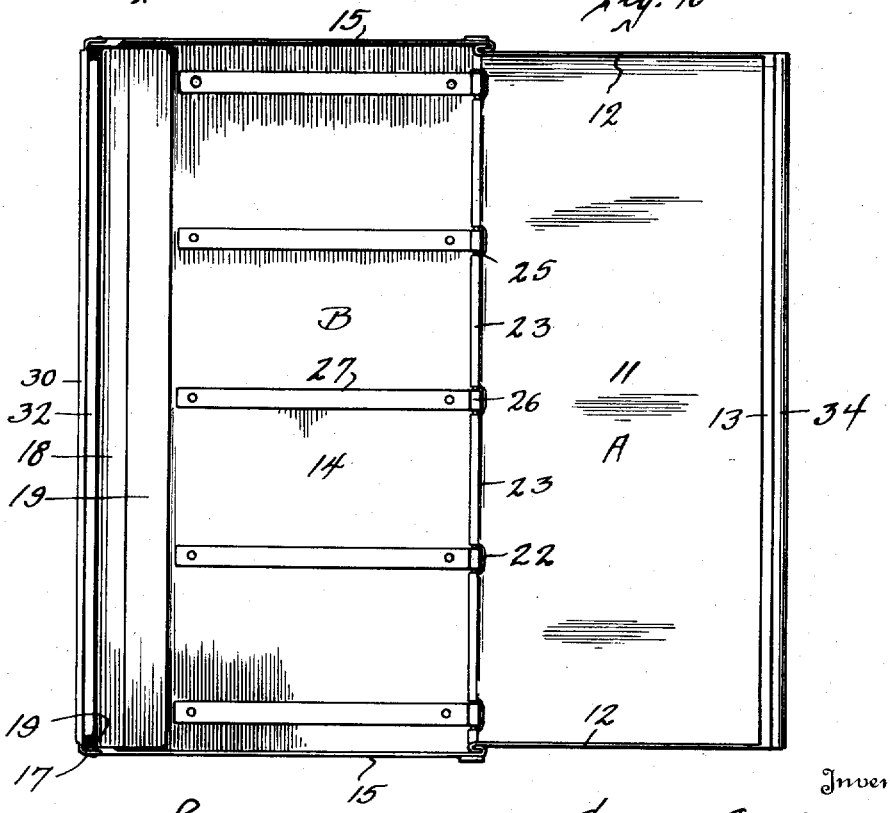
Fig. 3 is a plan view showing the parts in luggage carrier position.

The three main parts of the trunk are referred to generally in the drawings by the reference characters A, B, C and D, respectively. A is the fixed trunk member, B the movable trunk member, C the cover which forms a part of the movable member, and D is the hinge connecting the fixed and movable trunk members.

The fixed trunk member is formed with the rear wall 10, the bottom wall 11, the side walls 12 and the abbreviated top wall 13, as in previous constructions. The movable trunk member B has the rear wall 14, the side walls 15 and the cover C, including the top wall 16, the side flanges 17 and the rear flange 18. (It may be noted that the words "top" and "rear", when used to refer to the parts of a movable trunk member, correspond to the positions of the respective parts when the trunk is closed. This is done to identify the various parts with the use of as few words as possible.)

Figure 4:
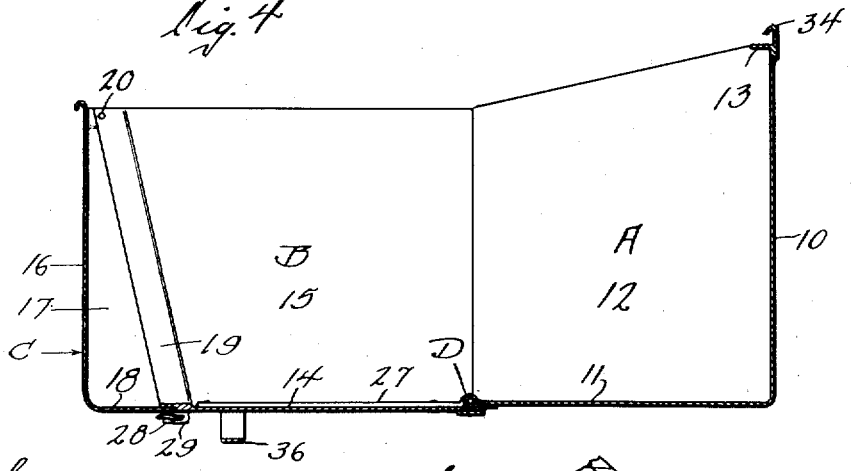
Fig. 4 is a transverse, sectional view showing the parts in luggage carrier position.

The rear wall 14 is provided with a shouldered flange 19, which is received within the flanges 17 and 18 of the cover C. The cover when closed rests against the shoulder of the flange 19, as indicated in Fig. 4.

The cover is hinged to the corner of the side walls 15, remote from the hinge D, connecting the fixed and movable trunk members. The hinge for the cover is formed by a pair of rivets or the like 20, inserted through the flanges 17 and 19 and constructed so as to hold these flanges together. To this end, the rivets should be formed with large heads or some equivalent of such a construction should be employed so that the constant hinging of the flanges relative to each other may not work the rivets loose.

It may be noted at this point that the sides 15 are unconnected save by the rear wall 14 and the cover 16. The latter serves to connect and brace apart the corners to which it is hinged.

The hinge D is formed by stamping and bending the edge of the bottom wall 11. Slots 21 are cut into the material of the walls adjacent the edges and the material behind the ends of these slots and between the slots, respectively, is formed to provide aprons 22 and sleeves 23, respectively. The material forming the sleeves 23 is bent back against the rear face of the wall 11, as at 24. A hinge rod 25 extends through the sleeves 23 and through hooks 26, formed on the ends of the hinge straps 27, secured to the rear wall 14. The hinge straps 27 are of less width than the hinge sleeve 23 and are correspondingly much thicker than the metal of the sleeve 23. Thus substantially equal strength is obtained in both of the hinge elements.

Figure 8:
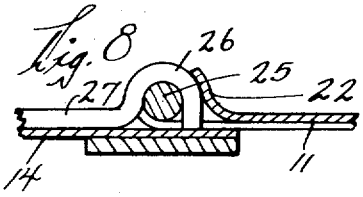
Fig. 8 is a detail, sectional view taken on the line 8—8 of Fig. 7.
Figure 9:
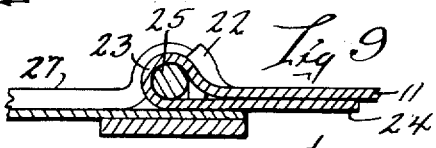
Fig. 9 is a detail, sectional view taken on the line 9—9 of Fig. 7.

The aprons 22 are formed on the surface of a cylinder coaxial with the sleeves 23 but of larger diameter so as to accommodate the extra thickness of the hooks 26. The aprons 22 close the space between the hooks 26 and the rear wall 14. The rear wall 14 is extended beyond the hinge as shown in Figs. 8 and 9 sufficiently to cover from below the spaces formed within the aprons 22.

The cover is secured in a closed position by means of latch devices 28 and 29, secured respectively to the cover and to the rear wall 14.

Figure 5:
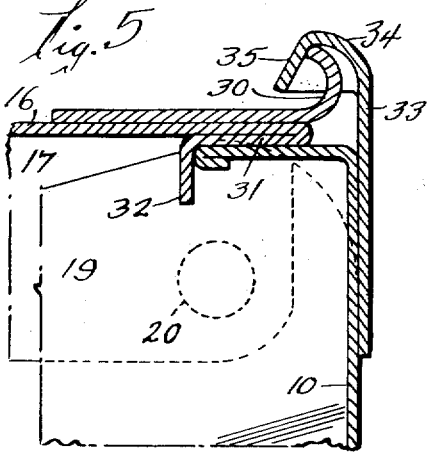
Fig. 5 is an enlarged, detail, sectional view through adjacent portions of the cover and fixed trunk member, the latching elements being in latched position.
Figure 6:
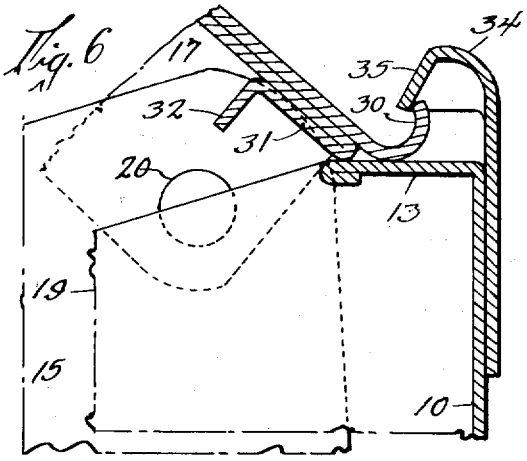
Fig. 6 is a similar view showing the parts in partially unlatched position.
Figure 7:
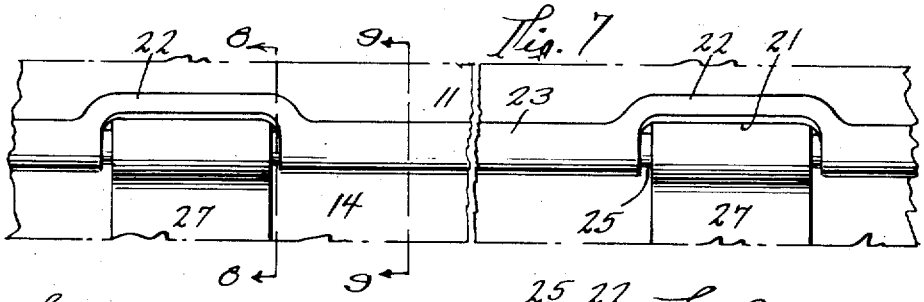
Fig. 7 is a detail, plan view of the hinge between the fixed and movable trunk sections.

The movable trunk member is secured to the fixed trunk member by means of the latch devices shown in detail in Figs. 5 and 6. The cover is provided with an upwardly curved flange 30, which is preferably formed of a separate sheet of material welded or otherwise permanently secured to the forward edge of the top wall 16. The forward marginal portion of the top wall 16 is bent or folded inwardly upon itself at 31, and this folded portion is bent downwardly substantially at right angles to form the flange 32. The fixed trunk member A is provided with a rearwardly curved flange 33, which is preferably formed of a separate sheet of material welded or otherwise permanently secured to the upper edge of the forward wall 10. The upper extremity of the flange 33 is formed with a channel 34, the rear part of which is substantially flat and extends downwardly and rearwardly upon an incline about as shown in Figs. 5 and 6, as at 35.

When it is desired to release the latching connection between the fixed and movable trunk members, the latch devices 29 and 28 are first released, the cover raised to substantially the angle shown in Fig. 6 and the movable trunk member pulled outwardly as by means of the handle 36 or the tire if there is one in connection with the trunk.

The raising of the cover allows the flange 30 to move downwardly to a position where it will clear the lower edge of the inclined wall 35 of the channel 34 and when the flange 30 has been unhooked, the cover may then be dropped to its former position and the elements 28 and 29 relatched. The entire member B may then be swung downwardly to the position shown in Fig. 4, as in previous trunks corresponding to my reissue patent above mentioned. When the trunk is closed, the flange 32 engages the forward edge of the wall 13 very tightly under pressure created between the flange 30 and the wall 35. It will be seen that as the cover is moved downwardly toward closed position, the flanges 32 and 30, respectively, will be drawn toward their respective engaging elements 13 and 35. The parts are so arranged that when the cover is fully closed, there will be some pressure built up between these respective engaging elements so as to produce a very snug engagement between the cover and fixed trunk member. The object of this is to prevent rattling. A further object is to seal as closely as possible against the entrance of moisture. Both joints cooperate toward this end, the channel 34 serving also to shed rain and prevent as largely as possible its entrance into the space between the forward extremity of the cover and the flange 33.

The inclined wall 35 further serves the purpose of automatically pulling the parts into snug engagement with each other as the cover is lowered. An inspection of Fig. 6 will show that when the edge of the flange 30 is first inserted behind the wall 35 at its lower extremity that there is considerable room for further movement of the movable trunk member toward the fixed trunk member. As the cover is lowered, the action of the flange 30 against the inclined wall 35 draws the cover snugly into the position shown in Fig. 5. The cover in turn moves the sides of the movable trunk member into their proper positions, the rivets 20 traveling forwardly and downwardly as the cover is lowered.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:—

1. In a combination trunk and luggage carrier, a fixed trunk member, a movable trunk member, hinged to the fixed trunk member, to form, when closed, rear and upper walls of the trunk and when open, to form bottom and rear walls of a luggage carrier, a cover, hinged to the movable trunk member on an axis that is adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, and coacting latch devices secured to the cover and fixed trunk member, respectively, to secure the movable trunk member in closed relation to the fixed trunk member.

2. In a combination trunk and luggage carrier, a fixed trunk member, a movable trunk member, hinged to the fixed trunk member, to form, when closed, rear and upper walls of the trunk, and, when open, to form bottom and rear walls of a luggage carrier, a cover, hinged to the movable trunk member adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, and coacting latch devices secured to the cover and fixed trunk member, respectively, to secure the movable trunk member in closed relation to the fixed trunk member, said latch devices being constructed to remain in engagement while allowing the cover to be raised a substantial portion of its path of movement.

3. In a combination trunk and luggage carrier, a fixed trunk member, a movable trunk member, carried by the fixed trunk member and adapted to move from a closed position serving as a rear wall for the fixed trunk member to an open extended position serving in conjunction with the fixed trunk member as a luggage carrier, a cover, hinged to the movable trunk member adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, an inverted channel shaped latch member on the fixed trunk member, and a coacting flange projecting upwardly from the forward extremity of the cover, adapted to be received in the channel when the cover is closed, to secure the movable trunk member in closed relation to the fixed trunk member.

4. In a combination trunk and luggage carrier, a fixed trunk member, a movable trunk member, carried by the fixed trunk member and adapted to move from a closed position serving as a rear wall for the fixed trunk member to an open extended position serving in conjunction with the fixed trunk member as a luggage carrier, a cover, hinged to the movable trunk member adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, the fixed trunk member including an upper wall, an inverted channel shaped latch member on the fixed trunk member, the rear edge of the latch member being spaced above said upper wall, and a coacting flange projecting upwardly from the forward extremity of the cover, adapted to be received in the channel when the cover is closed, to secure the movable trunk member in closed relation to the fixed trunk member, and to pass through said space between the latch member and the upper wall, when the cover has been raised a predetermined distance from the movable trunk member.

5. In a combination trunk and luggage carrier, a fixed trunk member, a movable trunk member, carried by the fixed trunk member and adapted to move from a closed position serving as a rear wall for the fixed trunk member to an open extended position serving in conjunction with the fixed trunk member as a luggage carrier, a cover, hinged to the movable trunk member on an axis that is adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, and coacting latch devices secured to the cover and fixed trunk member, respectively, to secure the movable trunk member in closed relation to the fixed trunk member, said latch members being constructed so as to be disengaged by raising of the cover.

6. In a combination trunk and luggage carrier, a fixed trunk member, a movable trunk member, carried by the fixed trunk member and adapted to move from a closed position serving as a rear wall for the fixed trunk member to an open extended position serving in conjunction with the fixed trunk member as a luggage carrier, a cover, hinged to the movable trunk member, adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, the fixed trunk member including an upper wall extending rearwardly from the forward wall of the fixed trunk member, and coacting latch members, to secure the movable trunk member in closed relation to the fixed trunk member, the cover being adapted to snugly engage said upper wall when the parts are all in closed position, and the coacting latch members, being adapted, upon closing movement of the cover, to urge the cover into said engagement.

7. In a combination trunk and luggage carrier, a fixed trunk member, a movable trunk member, hinged to the fixed trunk member, to swing from a vertical, closed position, to a horizontal, open position, serving, in conjunction with the fixed trunk member, as a luggage carrier, the movable trunk member including side walls and a rear wall connecting said side walls, and a cover, hinged to the side walls at the corners of the latter remote from the hinge between the fixed and movable trunk members, said cover being adapted to close the space between the fixed trunk member and the rear and side walls of the movable trunk member when all parts are in closed position, and serving as the sole direct connection between the side wall corners to which it is hinged, thereby supporting the side walls in spaced relation.

8. In a combination trunk and luggage carrier, a fixed trunk member, a movable trunk member, carried by the fixed trunk member, and adapted to move from a closed position to an extended open position, serving, in conjunction with the fixed trunk member, as a luggage carrier, the movable trunk member including side walls and a rear wall connecting said side walls, and a cover, comprising a top wall and a rear and side flanges forming, when the cover is closed, continuations of said rear and side walls, respectively, the side flanges being hinged to the side walls at corners of the latter remote from the fixed trunk member when said movable trunk member is in extended open position, said cover being adapted to close the space between the fixed trunk member and the rear and side walls of the movable trunk member when all parts are in closed position, and serving as the sole direct connection between the side wall corners to which it is hinged, thereby supporting the side walls in spaced relation.

9. In a combination trunk and luggage carrier, a fixed trunk member, a movable trunk member, hinged to the fixed trunk member to swing from a vertical, closed position, to a horizontal, open position, serving, in conjunction with the fixed trunk member, as a luggage carrier, a cover, hinged to the movable trunk member, the cover serving, when the movable trunk member is in closed position, to allow access to the contents of the trunk from the top, and serving, when the movable trunk member is in open position, to form a fixed part thereof, means to secure the cover in closed relation to the movable trunk member, and coacting latch members secured to the cover and fixed trunk member, respectively, to secure the movable trunk member in closed relation to the fixed trunk member.

10. In a combination trunk and luggage carrier, a fixed trunk member, a movable trunk member carried by the fixed trunk member and adapted to move from a closed position in which it serves as a rear wall for the fixed trunk member to an open, extended position in which it serves in conjunction with the fixed trunk member as a luggage carrier, the movable trunk member including side walls and a rear wall connecting said side walls and a cover hinged to the side walls at the upper, forward corners of the latter, said cover being adapted to close the space between the fixed trunk member and the rear and side walls of the movable trunk member when all parts are in closed position and serving as the sole direct connection between the side wall corners to which it is hinged, thereby supporting the side walls in spaced relation.

11. In a combination trunk and luggage carrier, a fixed trunk member, a movable trunk member carried by the fixed trunk member and adapted to move from a closed position in which it serves as a rear wall for the fixed trunk member to an open, extended position in which it serves in conjunction with the fixed trunk member as a luggage carrier, a cover, hinged to the movable trunk member, the cover serving, when the movable trunk member is in closed position, to allow access to the contents of the trunk from the top, and serving, when the movable trunk member is in open position, to form a fixed part thereof, means to secure the cover in closed relation to the movable trunk member, and coacting latch members secured to the cover and fixed trunk member, respectively, to secure the movable trunk member in closed relation to the fixed trunk member.

12. In a combination trunk and luggage carrier, a fixed trunk member, a movable trunk member carried by the fixed trunk member and adapted to move from a closed position in which it serves as a rear wall for the fixed trunk member to an open, extended position in which it serves in conjunction with the fixed trunk member as a luggage carrier, a cover, hinged to the movable trunk member adjacent the upper forward portion of the fixed trunk member when the movable trunk member is in closed position, the cover serving, when the movable trunk member is in said last mentioned position, to allow access to the contents of the trunk from the top, and serving, when the movable trunk member is in open position, to form a fixed part thereof, means to secure the cover in closed relation to the movable trunk member, and coacting latch devices secured to the cover and fixed trunk member, respectively, to secure the movable trunk member in closed relation to the fixed trunk member, said latch devices being constructed to remain in engagement while allowing the cover to be raised a substantial portion of its path of movement.

13. In a combination trunk and luggage carrier, a fixed trunk member, a movable trunk member having a hinged cover, and means for securing said movable trunk member in closed position relative to said fixed trunk member comprising coacting latch devices secured to said cover and to said fixed trunk member respectively, said latch devices remaining in engagement while allowing the cover to be raised a substantial portion of its path of movement and disengaging each other upon further swinging of said cover through said path of movement.

14. In a combination trunk and luggage carrier, a fixed trunk member, a movable trunk member having a hinged cover, means to secure said movable trunk member in closed relation to said fixed trunk member comprising an inverted channel shaped latch member on said fixed trunk member and a coacting flange projecting upwardly from the forward extremity of said cover adjacent the hinge thereof and adapted to be received in said channel when said cover is closed to secure said movable trunk member in closed relation to said fixed trunk member.

15. In a combination trunk and luggage carrier, a fixed trunk member having a top wall, a movable trunk member having a cover, means to secure said movable trunk member in closed relation to said fixed trunk member comprising an inverted channel shaped latch member on said fixed trunk member having a free edge spaced above the top wall thereof, and a coacting member projecting upwardly from the forward extremity of said cover and adapted to be received in said channel when said cover is closed to secure said movable trunk member in closed relation to said fixed trunk member and to pass beneath the free edge of said inverted channel shaped latch member when said cover has been swung a predetermined distance relative to the movable trunk member.

16. In a combination trunk and luggage carrier, a fixed trunk member, a movable trunk member having a cover, said fixed trunk member including an upper wall, and means to secure said movable trunk member in closed relation to said fixed trunk member comprising an inverted channel shaped latch member on said fixed trunk member, the rear edge of said latch member being spaced above said upper wall and a coacting flange projecting upwardly from the forward extremity of said cover and adapted to be received in said channel when the cover is closed to secure the movable trunk member in closed relation to the fixed trunk member and to pass through said space between said latch member and the upper wall when the cover has been raised a predetermined distance from the movable trunk member.

17. In a combination trunk and luggage carrier, a fixed trunk member, a movable trunk member having a hinged cover, means to secure said cover in closed relation to said movable trunk member in any position of the movable trunk member, the fixed trunk member including an upper wall, and coacting latch members to secure the movable trunk member in closed relation to the fixed trunk member, said cover being adapted to snugly engage said upper wall when the parts of the trunk and luggage carrier are all in closed position and the coacting latch members, upon closing movement of the cover and operation of said first means to securing position, coacting to urge the cover into said engagement.

18. In a combination trunk and luggage carrier, a fixed trunk member having an abbreviated top wall, and a movable trunk member having a fastening member, hinged to said movable trunk member for fastening said movable trunk member in closed position relative to said fixed trunk member, comprising an inverted channel shaped latch member on said fixed trunk member, said latch member having a rear wall spaced above the top wall of said fixed trunk member and sloping upwardly and forwardly, and a coacting flange projecting upwardly from the forward extremity of said fastening member and adapted to be received in said channel shaped latch member when the fastening member is in fastening position to secure the movable trunk member in closed relation to the fixed trunk member and to pass beneath said inverted channel shaped latch member when said fastening member has been raised a predetermined distance from the movabe trunk member, said flange being adapted to engage and slide along the sloping rear wall of said channel shaped member, when the fastening member is moved to closed position, for urging the latter member into close engagement with the top wall of said fixed trunk member.

19. In a combination trunk and luggage carrier, a fixed trunk member, a movable trunk member connected therewith, a cover for said trunk and luggage carrier hinged near the upper forward corner of the movable trunk member and means for securing said movable trunk member in closed position relative to said fixed trunk member, said means comprising coacting latch devices, one of which is an upstanding flange secured to said cover adjacent the hinge thereof, the other latch member being a downwardly and rearwardly opening channeled member secured to the upper forward portion of the fixed trunk member, said flanged latch member being adapted to move into and out of engagement with said channeled member only when said cover is swung a considerable distance through an arc on its hinge, whereby said latch devices may remain in engagement while allowing the cover to be raised a substantial portion of its range of movement.

20. In a combination trunk and luggage carrier, a fixed trunk member, a movable trunk member hinged along one edge to the fixed trunk member, said movable trunk member including a cover hinged thereto along an edge diagonally opposite to the first mentioned hinge connection considering the trunk in closed position, means to secure said cover in closed relation to said movable trunk member and cooperating latch devices on the exterior of the movable and fixed trunk members for securing the movable trunk member in closed relation to the fixed trunk member, said latch devices being adapted to engage at said second mentioned edge and being engaged by movement of said cover to closed position when the movable trunk member is in closed relation to the fixed trunk member and thereby incapable of being moved to disengaged position while said cover remains closed.

21. In a combination trunk and luggage carrier, a fixed trunk member, a movable trunk member having a movable cover, means to secure said cover in closed relation to said movable trunk member and coacting latch devices arranged on and exteriorly of the movable and fixed trunk members for holding said movable trunk member in closed relation to the fixed trunk member, said latch devices being brought into engagement when the movable trunk member is moved into closed relation to the fixed trunk member by operation of said means to securing position whereby the latch devices cannot be disengaged when the cover is closed.

ERNEST A. ARNDT.